United States Patent [19]

Erickson et al.

[11] Patent Number: 5,199,063
[45] Date of Patent: Mar. 30, 1993

[54] AUTOMATICALLY GENERATING TELEPHONE DIRECTORY LABELS FOR FACSIMILE DEVICES

[75] Inventors: Michael D. Erickson; Richard L. Kochis, both of Fort Collins, Colo.

[73] Assignee: Hewlett-Packard Company, Palo Alto, Calif.

[21] Appl. No.: 649,516

[22] Filed: Feb. 1, 1991

[51] Int. Cl.$^5$ .......................................... H04M 11/00
[52] U.S. Cl. ................... 379/100; 358/400; 358/401; 358/442
[58] Field of Search ............... 358/400, 402, 406, 407, 358/434, 440, 442, 401; 379/100, 96-98, 354, 355

[56] References Cited

U.S. PATENT DOCUMENTS

| | | | |
|---|---|---|---|
| 4,125,872 | 11/1978 | Maxwell | 379/355 |
| 4,741,021 | 4/1988 | Kotani et al. | 379/100 |
| 4,829,559 | 5/1989 | Izawa et al. | 379/100 |
| 4,841,375 | 6/1989 | Nakajima et al. | 358/442 |
| 4,900,902 | 2/1990 | Sakakibara | 358/400 |
| 4,908,853 | 3/1990 | Matsumoto | 379/355 |
| 4,910,607 | 3/1990 | Kita et al. | 358/400 |
| 5,001,572 | 3/1991 | Hashimoto et al. | 358/400 |

FOREIGN PATENT DOCUMENTS

| | | | |
|---|---|---|---|
| 59-221068 | 12/1984 | Japan | 358/400 |
| 63-220651 | 9/1988 | Japan | 379/100 |
| 2-181568 | 7/1990 | Japan | 379/100 |
| 2-196552 | 8/1990 | Japan | 379/355 |

*Primary Examiner*—James L. Dwyer
*Assistant Examiner*—Wing F. Chan

[57] ABSTRACT

A facsimile device (also called a fax machine), having programmable autodial capabilities, which automatically generates legible telephone directory labels. The fax machine of the present invention has a window for displaying the telephone directory label and a memory for storing programmed telephone numbers and names. The fax machine also has a port which is connected to a printer. To automatically generate the telephone directory label, the fax machine accesses the memory for the programmed telephone numbers and names. Then, the fax machine causes the printer to print the telephone directory label by sending commands and the programmed telephone numbers and names to the printer.

13 Claims, 6 Drawing Sheets

AUTODIAL STATIONS:

| | | | |
|---|---|---|---|
| 00 | BRIAN 00 | 20 | ABCDEFGHIJKLMNO |
| 01 | | 21 | AAAAAAAAA |
| 02 | | 22 | |
| 03 | | 23 | |
| 04 | | 24 | |
| 05 | | 25 | |
| 06 | | 26 | |
| 07 | | 27 | |
| 08 | | 28 | |
| 09 | | 29 | |
| 10 | | 30 | |
| 11 | | 31 | |
| 12 | 2299141 | 32 | |
| 13 | | 33 | |
| 14 | | 34 | |
| 15 | | 35 | |
| 16 | | 36 | |
| 17 | | 37 | |
| 18 | | 38 | |
| 19 | P | 39 | THIRTY-NINE |

AUTOMATICALLY GENERATING TELEPHONE DIRECTORY LABELS FOR FACSIMILE DEVICES

BACKGROUND OF THE INVENTION

1. Field Of The Invention

The present invention relates generally to facsimile devices, and more particularly to facsimile devices having programmable autodial capabilities.

2. Related Art

Facsimile devices (also called fax machines) are used for electronically transferring data and/or images, in electronic form and/or printed matter form, from a source location to a destination location via a communication system, such as a telephone system.

Fax machines are available which print the received data and/or images on thermal paper using thermal printing technology. Fax machines are also available which print the received data and/or images on ordinary paper using other printing technologies, such as laser printing technology.

Also, fax machines having programmable autodial capabilities are available. The programmable autodial capabilities allow users to program the fax machines with often-used telephone numbers. To dial one of the programmed telephone numbers, users need only press an appropriate button or enter an appropriate code associated with the desired programmed telephone number. Thus, users may dial telephone numbers without having to remember and enter the telephone numbers.

The fax machines having programmable autodial capabilities often have on their front panels a clear pouch, or window, for holding a telephone directory label. The telephone directory label lists the programmed telephone numbers and the associated buttons or codes. The telephone directory label is inserted inside the window for reference by users.

Generating the telephone directory label is a difficult task because (1) a list of the programmed telephone numbers must be manually compiled, and (2) the telephone directory label must be manually generated, either by hand or by a mechanical device (such as a typewriter).

Also, the telephone directory label is often illegible because it is generated by hand. Preferably, a typewriter is used to generate the telephone directory label. However, typewriters may be inadequate due to the small size of the window.

Thus, an apparatus and method for automatically generating legible telephone directory labels for fax machines having programmable autodial capabilities is required.

SUMMARY OF THE INVENTION

The present invention is directed to facsimile devices (also called fax machines) having programmable autodial capabilities, and more particularly to facsimile devices which automatically generate legible telephone directory labels.

The fax machines of the present invention have a window for displaying the telephone directory label and a memory for storing programmed telephone numbers and names. The fax machines also have a port which is connected to a printer. To automatically generate the telephone directory label, the fax machine accesses the memory for the programmed telephone numbers and names. Then, the fax machine causes the printer to print the telephone directory label by sending commands and the programmed telephone numbers and names to the printer.

Specifically, the fax machine selects a font and sends a corresponding font command to the printer. Then, the fax machine selects a printing orientation and sends a corresponding printing orientation command to the printer. Then, the fax machine causes the printer to print a template of the telephone directory label. The template of the telephone directory label includes a list of 2-digit codes corresponding to autodial stations. Then, the fax machine causes the printer to print the programmed names in the template. The programmed names are printed next to the codes associated with the programmed names.

Thus, the fax machine of the present invention automatically generates the telephone directory labels. The telephone directory labels are legible since they are generated using a printer.

Further features and advantages of the present invention, as well as the structure and operation of various embodiments of the present invention, are described in detail below with reference to the accompanying drawings, and in the claims. In the drawings, like reference numbers indicate identical or functionally similar elements.

BRIEF DESCRIPTION OF THE DRAWINGS

The present invention will be described with reference to the accompanying drawings, wherein:

FIG. 6 illustrates a sample telephone directory label of a preferred embodiment of the present invention.

DETAILED DESCRIPTION OF THE PREFERRED EMBODIMENTS

The present invention is directed to facsimile devices (also called fax machines) having programmable autodial capabilities, and more particularly to facsimile devices which automatically generate legible telephone directory labels.

Figure 1:
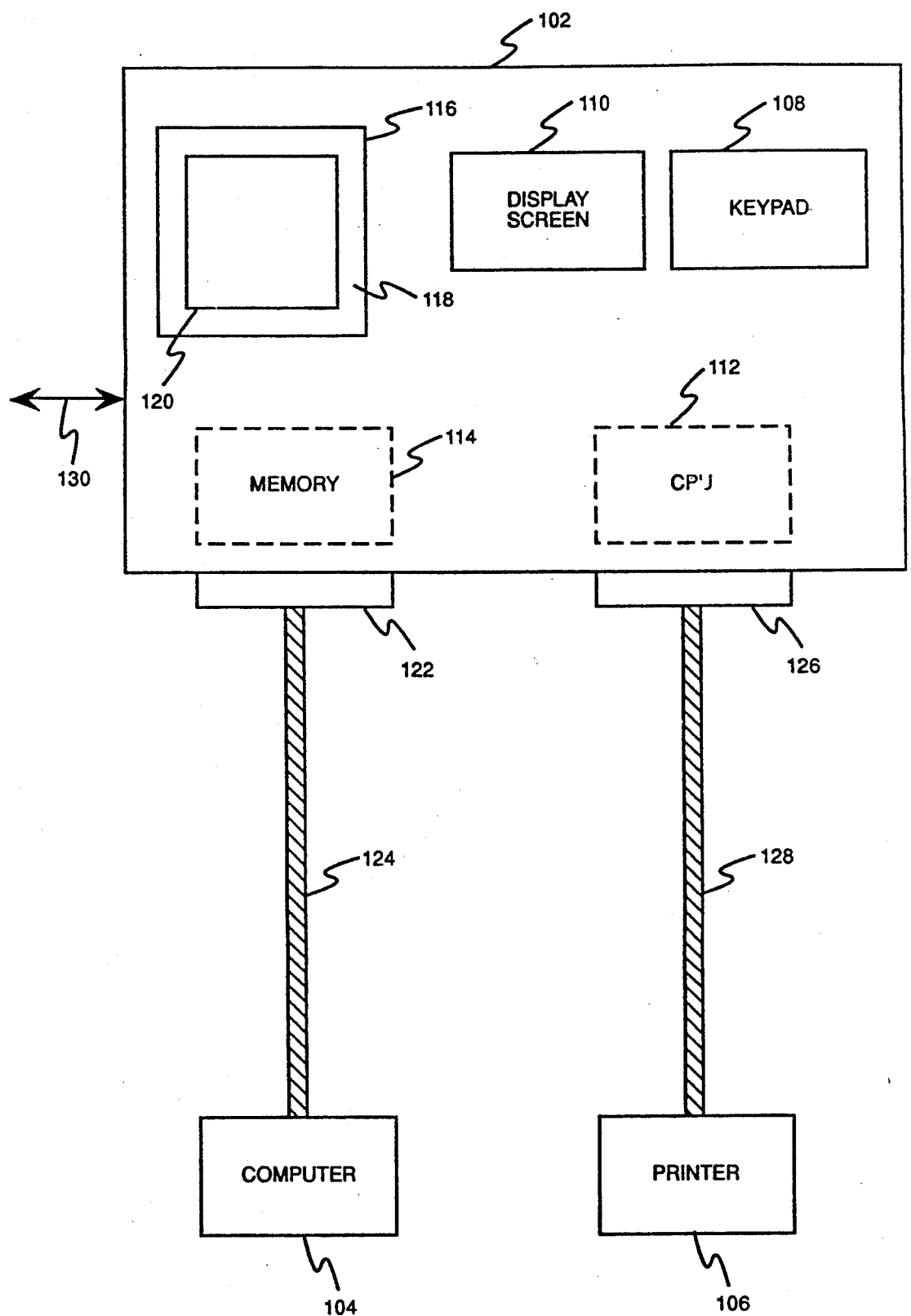
FIG. 1 represents a structural diagram of a preferred embodiment of the present invention.

FIG. 1 illustrates a preferred embodiment of the present invention. The preferred embodiment includes a fax machine 102, a computer 104, and a printer 106. The fax machine 102 is connected to a telephone system via connection 130.

In the preferred embodiment of the present invention, the fax machine 102 is a Hewlett-Packard (HP) LaserFAX model C1740A or compatible. The HP LaserFAX employs laser printing technology. The computer 104 is an HP Vectra personal computer or other IBM-compatible personal computer. The printer 106 is an HP LaserJet printer II, IID, IIP, III, IIID, or later model.

The fax machine 102 includes a keypad 108, a display screen 110, and a window 116. The window 116 is formed by a transparent covering 118, which may be made of transparent plastic or glass. A telephone directory label 120 is inserted within the window 116 behind the transparent covering 118.

The keypad 108, display screen 110, and window 116 are located on the exterior of the fax machine 102, and preferably on a front panel of the fax machine 102.

The fax machine 102 also includes a first port 122 and a second port 126. The fax machine 102 is connected to the computer 104 via the first port 122 and a first cable 124. The fax machine 102 is connected to the printer 106 via the second port 126 and a second cable 128. In the preferred embodiment of the present invention, the first port 122 and first cable 124 may be either parallel or serial, depending on the specific features of the fax machine 102 and the computer 104. In the preferred embodiment of the present invention, the second port 126 and the second cable 128 are parallel to take advantage of the high printing speed of the printer 106.

The fax machine 102 further includes a central processing unit (CPU) 112 and a battery-backed random access memory (RAM) 114. As denoted by their dashed-line representations, the CPU 112 and memory 114 are located inside the fax machine 102. In the preferred embodiment of the present invention, the CPU 112 is an Intel 80186 microprocessor.

FIGS. 2, 3, 4, and 5 illustrate the operation of the fax machine 102 of the present invention. In the preferred embodiment of the present invention, the operation of the fax machine 102 is controlled by computer software written in assembly language appropriate for the Intel 80186 microprocessor. In an alternate embodiment, the operation of the fax machine 102 is controlled entirely by hardware.

Figure 2:
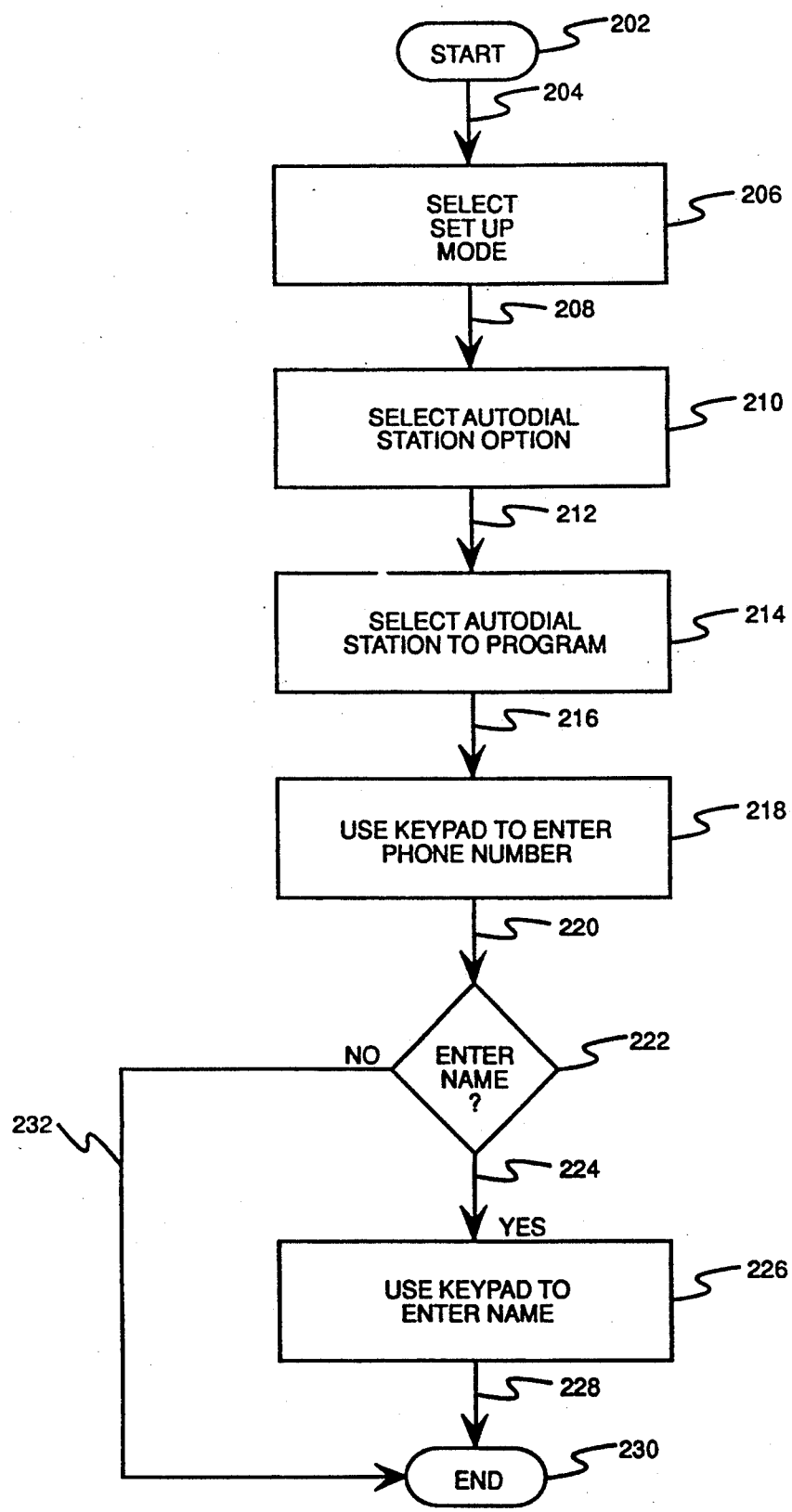
FIG. 2 illustrates the manner in which a facsimile machine of the present invention is programmed using a keypad and display screen.
Figure 3:
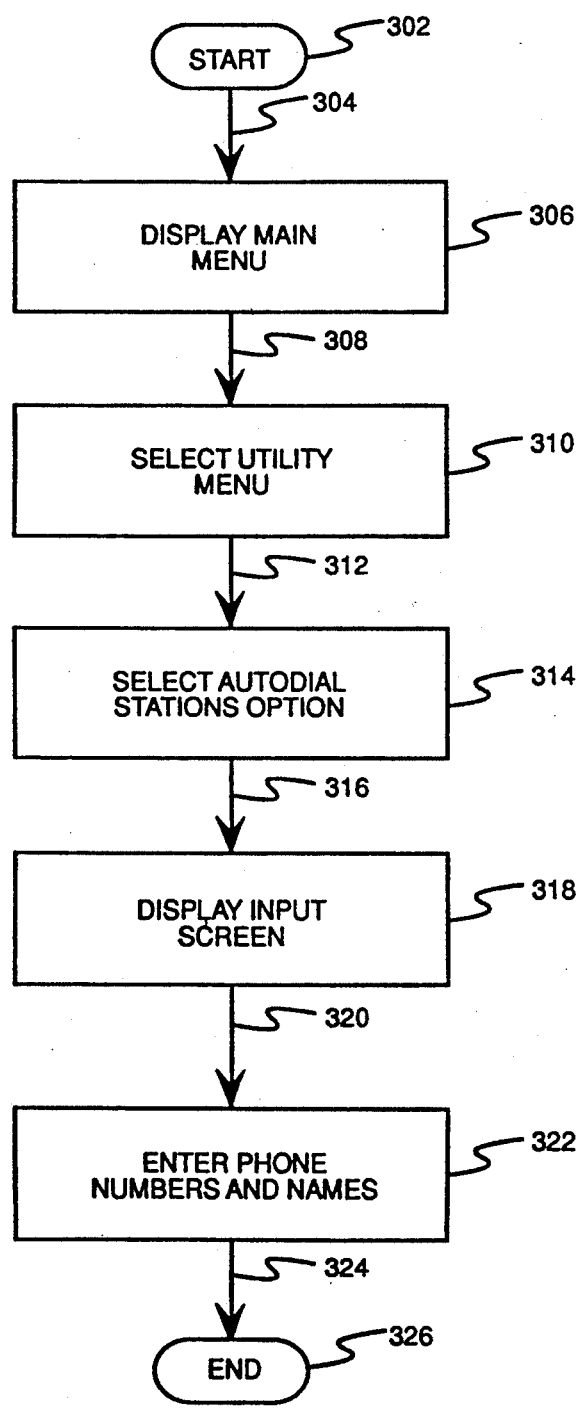
FIG. 3 illustrates the manner in which a facsimile machine of the present invention is programmed using a computer.

The manner in which the fax machine 102 is programmed with telephone numbers is illustrated in FIGS. 2 and 3. In the preferred embodiment of the present invention, the fax machine 102 comprises 40 autodial stations. That is, the fax machine can be programmed with up to 40 telephone numbers and 40 names. The 40 autodial stations are uniquely assigned 2-digit codes ranging from 00 to 39.

FIG. 2 illustrates the manner in which the fax machine 102 is programmed using the keypad 108 and display screen 110. FIG. 3 illustrates the manner in which the fax machine 102 is programmed using the computer 104.

Referring first to FIG. 2, in step 206 an operator uses the keypad 108 to select a setup mode of the fax machine 102. In response to the operator's selection, setup mode options are displayed on the display screen 110.

In step 210, the operator uses the keypad 108 to select an autodial station option. In response to the operator's selection, a prompt asking the operator to identify an autodial station to program appears in the display screen 110.

In step 214, the operator selects an autodial station to program by entering the appropriate 2-digit code using the keypad 108. In response to the operator's selection, a prompt asking the operator to enter a telephone number appears in the display screen 110.

In step 218, the operator uses the keypad 108 to enter a telephone number. The fax machine 102 associates the entered telephone number with the selected autodial station and saves the entered telephone number in the memory 114.

In step 222, the operator indicates whether he wishes to associate a name with the selected autodial station and the entered telephone number. The operator may so indicate by pressing an ENTER key on the keypad 108 once (to enter a name) or twice (to not enter a name). If the operator decides not to enter a name, then programming the fax machine 102 using the keypad 108 is complete (see line 232). The fax machine 102 enters a normal operating mode.

If the operator decides to enter a name, then in step 226 the operator uses the keypad 108 to enter a name. The fax machine 102 associates the entered name with the entered telephone number and selected autodial station and stores the entered name in the memory 114. Following the completion of step 226, the programming of the fax machine 102 using the keypad 108 is complete (see line 228) and the fax machine 102 enters the normal operating mode.

FIG. 3 illustrates the manner in which the fax machine 102 is programmed using the computer 104. The operation of the computer 104 is controlled by computer software which is written in the C computer programming language.

In step 306, a main menu is displayed on a screen of the computer 104.

In step 310, an operator uses a keyboard of the computer 104 to select a utility menu. In response to the operator's selection, options associated with the utility menu are displayed on the screen.

In step 314, the operator uses the keyboard to select an Autodial Stations option.

In step 318, in response to the operator's selection in step 314, a display input screen is displayed on the screen. The display input screen contains a list of the 40 autodial stations (with codes from 00 to 39) and the telephone numbers and names currently associated with the 40 autodial stations.

In step 322, the operator uses the keyboard to add, modify, and/or delete the telephone numbers and names associated with the autodial stations. The computer 104 transfers the operator's additions, modifications, and deletions to the fax machine 102 over cable 124 and first port 122. The fax machine 102 stores the operator's additions, modifications, and deletions in the memory 114.

To dial one of the programmed telephone numbers, the operator uses the keypad 108 to enter the appropriate 2-digit code associated with the telephone number and the autodial station. In an alternate embodiment of the present invention, buttons would be associated with the autodial stations. The buttons would be located on the front panel of the fax machine 102. To dial one of the programmed telephone numbers, the operator would press the appropriate button.

Figure 4:
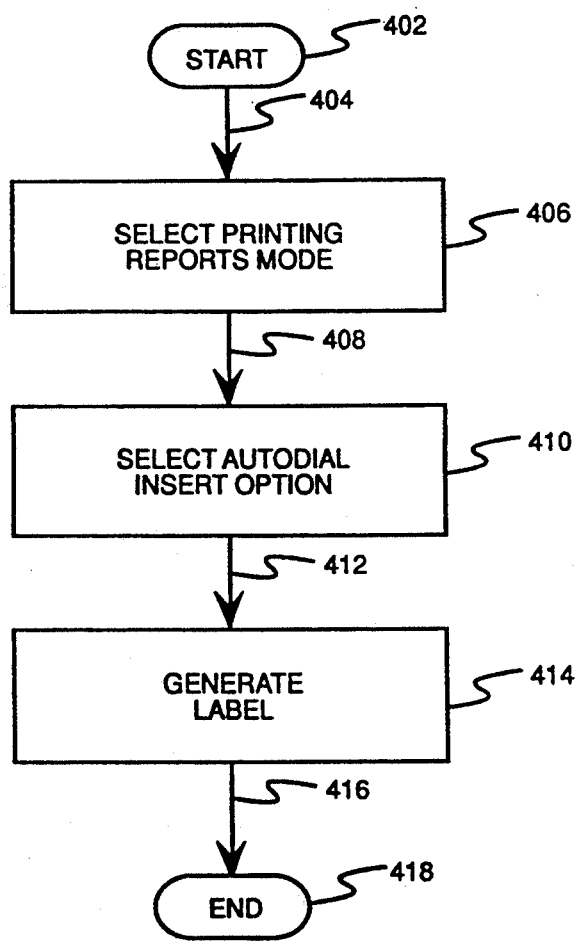
FIG. 4 illustrates the manner in which a facsimile machine of the present invention automatically generates legible telephone directory labels.
Figure 5:
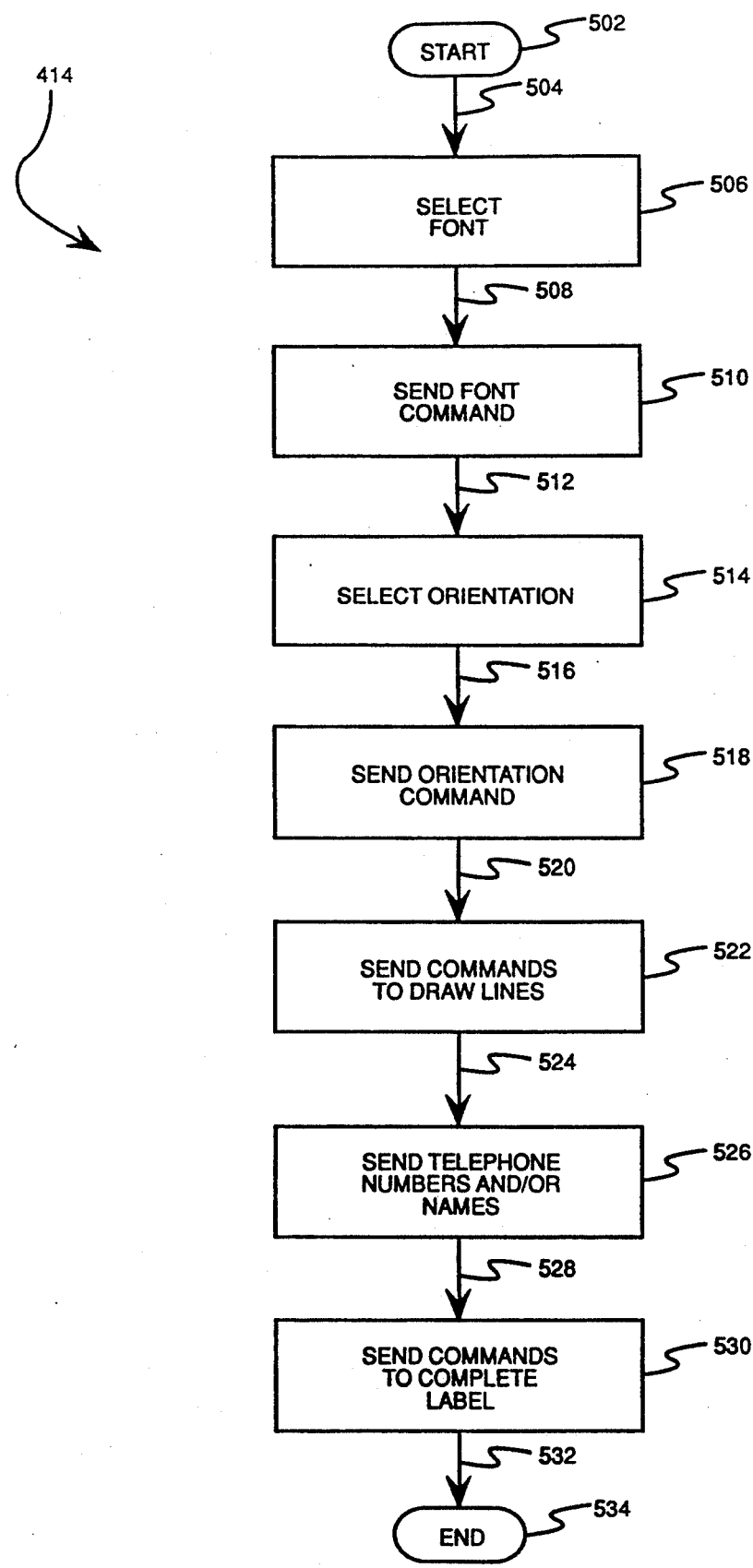
FIG. 5 further illustrates the manner in which a facsimile machine of the present invention automatically generates legible telephone directory labels.

FIGS. 4 and 5 illustrate the manner in which the fax machine 102 of the present invention automatically generates legible telephone directory labels 120 for insertion in the window 116.

Referring first to FIG. 4, in step 406 an operator uses the keypad 108 to select a printing reports mode of the fax machine 102. In response to the operator's selection, the fax machine 102 enters the printing reports mode and displays printing reports mode options on the display screen 110.

In step 410, the operator uses the keypad 108 to select an autodial insert option 410.

In step 414, in response to the operator's selection in step 410, the fax machine 102 automatically generates a telephone directory label 120 by sending appropriate commands and data to the printer 106.

FIG. 6 illustrates a sample telephone directory label 120 of the preferred embodiment of the present invention. The 2-digit codes associated with the 40 autodial stations are located in columns 602a, 602b. The names associated with the 40 autodial stations are located in columns 604a, 604b next to the corresponding codes in columns 602a, 602b.

For some programmed autodial stations, the names are represented by proper names, such as "Brian" in code 00. For other programmed autodial stations, the names are represented by telephone numbers (associated with the autodial stations), such as "2299141" in code 12. For other programmed autodial stations, the names are represented by arbitrary values, such as "abcdefghijklmno" in code 20 and "Thirty-Nine" in code 39. For other autodial stations (and for unprogrammed autodial stations), the names are blank, such as code 01. The value of the names depends on the operator's input during steps 226 and 322 in FIGS. 2 and 3, respectively.

After the fax machine 102 causes the printer 106 to print the telephone directory label 120, an operator clips the telephone directory label 120 along the outer boundary and places the telephone directory label 120 in the window 116.

The operation of the fax machine 102 during step 414 of FIG. 4 is described in greater detail below with reference to FIG. 5.

In step 506, the fax machine 102 selects a font for the telephone directory label. In the preferred embodiment of the present invention, the font is line printer font.

In step 510, the fax machine 102 sends a font command consistent with the selection made in step 506 to the printer 106.

In step 514, the fax machine 102 selects a printing orientation for the telephone directory label. In the preferred embodiment of the present invention, the orientation is portrait.

In step 518, the fax machine 102 sends an orientation command consistent with the selection made in step 514 to the printer 106.

In step 522, the fax machine 102 generates a telephone directory label template. Specifically, the fax machine 102 sends commands to the printer 106 to cause the printer 106 to generate the horizontal and vertical lines of the telephone directory label 120 shown in FIG. 6. The fax machine 102 also sends commands to the printer 106 to cause the printer 106 to print the 2-digit codes and the "Autodial Stations:" header. The horizontal and vertical lines, the 2-digit codes, and the header represent the telephone directory label template.

In step 526, the fax machine 102 fills in the telephone directory label template with the programmed names. Specifically, the fax machine 102 accesses the memory 114 for the names (whether they be proper names, telephone numbers, or arbitrary values) associated with the autodial stations and sends commands and information to the printer 106 to cause the printer 106 to print the names next to the appropriate 2-digit codes.

In step 530, the fax machine 102 sends commands to the printer 106 to complete the telephone directory label 120. For example, the fax machine 102 may send a form feed command to cause the printer 106 to eject the telephone directory label 120.

While various embodiments of the present invention have been described above, it should be understood that they have been presented by way of example only, and not limitation. Thus, the breadth and scope of the present invention should not be limited by any of the above-described exemplary embodiments, but should be defined only in accordance with the following claims and their equivalents.

What is claimed is:

1. A facsimile device used with an external printer, for facsimile device having programmable autodial capabilities, for automatically generating a legible telephone directory label, said facsimile device comprising:
   (1) a window for displaying said telephone directory label;
   (2) memory means for storing autodial information, said autodial information including names;
   (3) a port for connecting said external printer; and
   (4) means for automatically generating said telephone directory label compatible in size and format for display in said window, by sending commands and said autodial information to said external printer through said port.

2. The facsimile device of claim 1, further comprising:
   (5) a keypad for entering said autodial information; and
   (6) means for storing said autodial information in said memory means.

3. The facsimile device of claim 1, further comprising:
   (5) a second port for connecting a computer;
   (6) means coupled to said second port for receiving said autodial information from said computer; and
   (7) means for storing said autodial information in said memory means.

4. The facsimile device of claim 1, wherein said means for automatically generating said telephone directory label comprises:
   first means for selecting a font;
   second means coupled to said first means for sending a font command to said printing means;
   third means for selecting a printing orientation;
   fourth means coupled to said third means for sending a printing orientation command to said printing means;
   fifth means for printing a template of said telephone directory label; and
   sixth means for printing said programmed names in said template.

5. The facsimile device of claim 4, wherein said template comprises a list of codes corresponding to autodial stations.

6. The facsimile device of claim 5, wherein said fifth means comprises:
   means for sending horizontal line commands to said printing means;
   means for sending vertical line commands to said printing means;
   means for sending code commands to said printing means; and
   means for sending a header command to said printing means.

7. The facsimile device of claim 5, wherein said sixth means comprises:
   means for retrieving said programmed names from said memory means;
   means for associating said programmed names with said codes and said autodial stations; and
   means for printing said programmed names in said template adjacent to said associated codes by sending printing commands and said programmed names to said printing means.

8. The facsimile device of claim 1, further comprising:
(5) means for receiving electronic data from remote facsimile devices; and
(6) means for printing said electronic data using laser printing technology.

9. A method for automatically generating a legible telephone directory label, adapted for use with a facsimile device having programmable autodial capabilities including memory for storing autodial information, a window for displaying said telephone directory label, and a port for connecting an external printer, said method comprising the steps of:
(a) retrieving said autodial information form a memory; and
(b) generating said telephone directory label by sending printer commands and said autodial information through said port to said external printer, such that said telephone directory label is compatible in size and format for display in said window.

10. The method of claim 9, wherein said step for generating said telephone directory label comprises the steps of:
selecting a font;
sending a font command to said printer;
selecting a printing orientation;
sending a printing orientation command to said printer;
printing a template of said telephone directory label, said template compatible in size and format for display in said window, and compatible with the number of autodial stations of said facsimile device; and
printing said programmed names in said template.

11. The method of claim 10, wherein said template comprises a list of codes corresponding to autodial stations.

12. The method of claim 11, wherein said step for printing a template of said telephone directory label comprises the steps of:
sending horizontal line commands to said printer;
sending vertical line commands to said printer;
sending code commands to said printer; and
sending a header command to said printer.

13. The method of claim 11, wherein said step for printing said programmed names in said template comprises the steps of:
retrieving said programmed names from said memory;
associating said programmed names with said codes and said autodial stations; and
printing said programmed names in said template adjacent to said associated codes by sending printing commands and said programmed names to said printer.

* * * * *